Dec. 25, 1923.
A. PINARD
VEHICLE RUNNER
Filed April 2, 1921
1,478,796
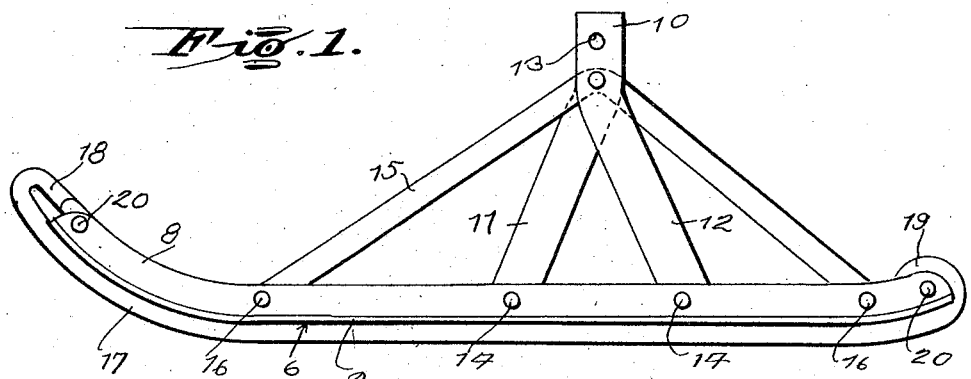
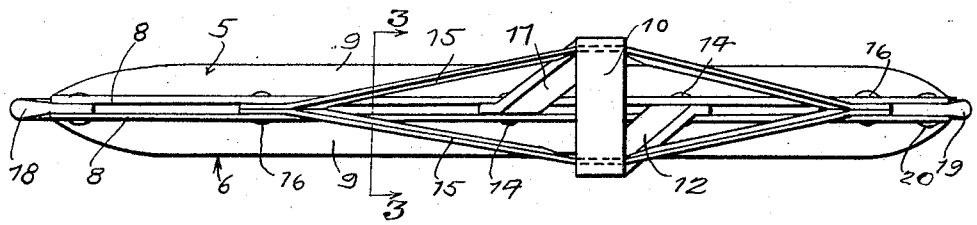
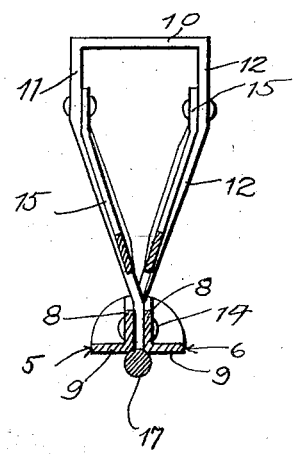 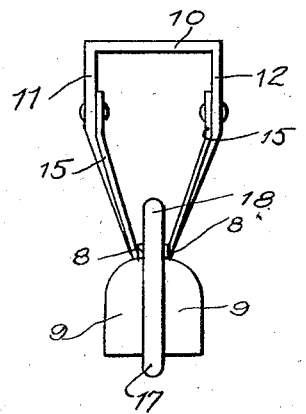
A. Pinard.
INVENTOR.
BY Watson E. Coleman
ATTORNEY.

Patented Dec. 25, 1923.

1,478,796

UNITED STATES PATENT OFFICE.

ALBERT PINARD, OF EAST CHARLESTON, VERMONT.

VEHICLE RUNNER.

Application filed April 2, 1921. Serial No. 457,915.

*To all whom it may concern:*

Be it known that I, ALBERT PINARD, a citizen of the United States, residing at East Charleston, in the county of Orleans and State of Vermont, have invented certain new and useful Improvements in Vehicle Runners, of which the following is a specification, reference being had to the accompanying drawings.

This invention relates to runners for vehicles such as automobiles and motorcycles to permit the use of these vehicles on snow or ice covered roads.

An object of the invention is to provide a runner of this character capable of being readily attached to the axle of a vehicle and arranged to oscillate thereon to permit the vehicle to ride over obstructions in the road.

Another object of the invention is to provide a runner including a pair of running members having flanges to which vehicle supporting means are attached, the means for securing the supporting means to the runners also serving to connect the running members to each other.

A still further object of the invention is to provide a runner including running members constructed from angle irons and secured to each other in spaced parallel relation, the lower surface of the runner members being provided with a keel member which is partially disposed within the space formed between said member, to prevent skidding of the runner and to facilitate movement of the runner over snow and ice covered surfaces.

With these and other objects in view the invention consists in the improved construction and arrangement of parts to be hereinafter more particularly described, fully claimed and illustrated in the accompanying drawings, in which:

Figure 1 is a side elevation of a vehicle runner constructed in accordance with an embodiment of the invention.

Figure 2 is a top plan view;

Figure 3 is a section taken on the line 3—3 of Figure 2; and

Figure 4 is a front elevation of the runner.

Referring to the drawings, 5 and 6 designate runner members, each member being constructed of angle iron, and having their end portions curved upwardly to prevent the same from penetrating the ground during the oscillating movement of the runner. The runner members 5 and 6 are positioned with their flanges 8 in spaced parallel relation to each other, the remaining flanges 9 serving as the runner faces.

An axle engaging member 10 is provided, said member being substantially U-shaped and having its arms 11 and 12 extended laterally of said member and in opposite directions, the ends of said arms being disposed substantially in alignment with each other. Registering openings 13 are provided in the upper portion of the member 10 for the reception of an axle or like means for connecting the runner to the vehicle. The ends of the member 10 are adapted to be disposed between the flanges 8 of the runner members 5 and 6. In this way, the flanges 8 cooperate to form a channel. Fastening means 14 such as rivets are passed through the flanges 8 and the ends of the member 10 to not only secure the member 10 to the runner members, but the runner members to each other. The member 10 is disposed adjacent the intermediate portion of the runner members so as to permit the front portion of said members to readily glide over any obstruction they may encounter.

A pair of braces 15 are used to brace the member 10 with respect to the runner members 5 and 6. Each brace consists of a length of material secured at its intermediate portion to the upper portion of one of the arms of the member 10, the ends of said length being disposed within the channel formed by the flanges 8 of the members 5 and 6. One brace is disposed on each side of the member 10, the corresponding ends of said braces being positioned in engagement with each other within the channel. Fastening means 16 such as rivets or bolts are passed through the ends of the braces 15 and the flanges 8. It will be noted that the fastening means of the ends of the member 10 and the fastening means of the ends of the braces are disposed in spaced relation to each other longitudinally of the flanges 8. In this way, the fastening means serve to connect the flanges 8 at intervals longitudinally thereof.

In order to close the longitudinal opening formed on the bottom of the runners by disposing the flanges 8 in spaced relation to each other, there is provided a novel keel member consisting of a rod 17 having its end portions 18 and 19 extended back upon said bar and disposed between the ends of the flanges 8, fastening means 20 being passed through said flanges and the ends of the bar. It will be noted that the diameter of the bar is slightly greater than the space between the members 5 and 6 so that only a portion of the bar is disposed within said space. This prevents lateral movement of the bar and at the same time closes the space between the runners. The projecting portion of the bar prevents skidding of the runner and facilitating movement of the runner over the ice and snow.

From the foregoing it will be readily seen that this invention provides a novel form of runner capable of being manufactured from a small amount of material and so arranged that every portion of the device performs an important function. In other words there is no waste of material. The flanges 8 not only brace the runner members but cooperate to form a channel for the vehicle supporting means and in view of this channel, it is possible to use a novel keel member, which increases the usefulness of the runner. In addition to this the runner may be constructed in various sizes and applied to all vehicles including motorcycles as no special means of mounting the runner on the vehicle is necessary.

What is claimed is:

A runner attachment for vehicles including a pair of spaced parallel angle iron members having their lower flanges extending outwardly in opposite directions and their ends upturned, a shoe extending from end to end of said members and contacting the latter throughout at the junctures of their flanges, said shoe being of circular cross section and having its ends return bent and secured between the ends of said members, an inverted substantially U-shaped support having its lower ends respectively directed forwardly and rearwardly and secured between said members, the side arms of said support having transversely aligned openings in the upper portions thereof for reception of the axle of the vehicle, and a pair of parallel braces for said support, each attached to the upper portion of one side arm of the support and extending forwardly and rearwardly from the latter and secured and terminating between said members.

In testimony whereof I hereunto affix my signature.

ALBERT PINARD.